United States Patent
Elgh

Patent Number: 6,077,008
Date of Patent: Jun. 20, 2000

[54] SAFETY DEVICE FOR PRELOADED BOLTS

[75] Inventor: Martin Elgh, Hofors, Sweden

[73] Assignee: Ovaka Couplings AB, Hofors, Sweden

[21] Appl. No.: 09/155,873

[22] PCT Filed: Apr. 9, 1979

[86] PCT No.: PCT/SE97/00576

§ 371 Date: Oct. 7, 1998

§ 102(e) Date: Oct. 7, 1998

[87] PCT Pub. No.: WO97/38827

PCT Pub. Date: Oct. 23, 1997

[30] Foreign Application Priority Data

Apr. 16, 1996 [SE] Sweden .................................. 9601427

[51] Int. Cl.[7] .................................................. F01B 25/00
[52] U.S. Cl. ................................ 411/14.5; 411/14; 73/761
[58] Field of Search .............................. 75/761; 411/14.5, 411/14, 8, 916

[56] References Cited

U.S. PATENT DOCUMENTS

| | | | |
|---|---|---|---|
| 2,316,720 | 4/1943 | Ramsey | 411/916 |
| 2,562,831 | 7/1951 | Stone | 73/761 |
| 2,995,033 | 8/1961 | Stifano | 411/14 |
| 3,844,533 | 10/1974 | Markiewicz et al. | |
| 4,185,504 | 1/1980 | Exner | 411/14 |
| 4,927,305 | 5/1990 | Peterson | 411/14 |

FOREIGN PATENT DOCUMENTS

WO 92/14938  9/1992  WIPO .

*Primary Examiner*—Flemming Saether
*Attorney, Agent, or Firm*—Burns, Doane, Swecker & Mathis, L.L.P.

[57] ABSTRACT

A safety device used in preloading of bolts for providing the bolts with an internal stress in a mounted condition, wherein a first end of the bolt is secured to a first element and extends through a second element, which clamps to the first element, and where a hydraulic preloading device is temporarily applied to a second end of the bolt for axially stretching the bolt to create the external stress. The safety device incorporates a safety tensile bar detachably fitted to the first end of the bolt, and extending through a central bore in the bolt, and further through the hydraulic preloading device while being held adjacent its opposite end in an expanding plug. The expanding plug is provided in a frictional contact with a sleeve, which guides the plug to create a counter hold for absorbing relieved energy in case of the breaking of the bolt during the preloading operation.

3 Claims, 1 Drawing Sheet

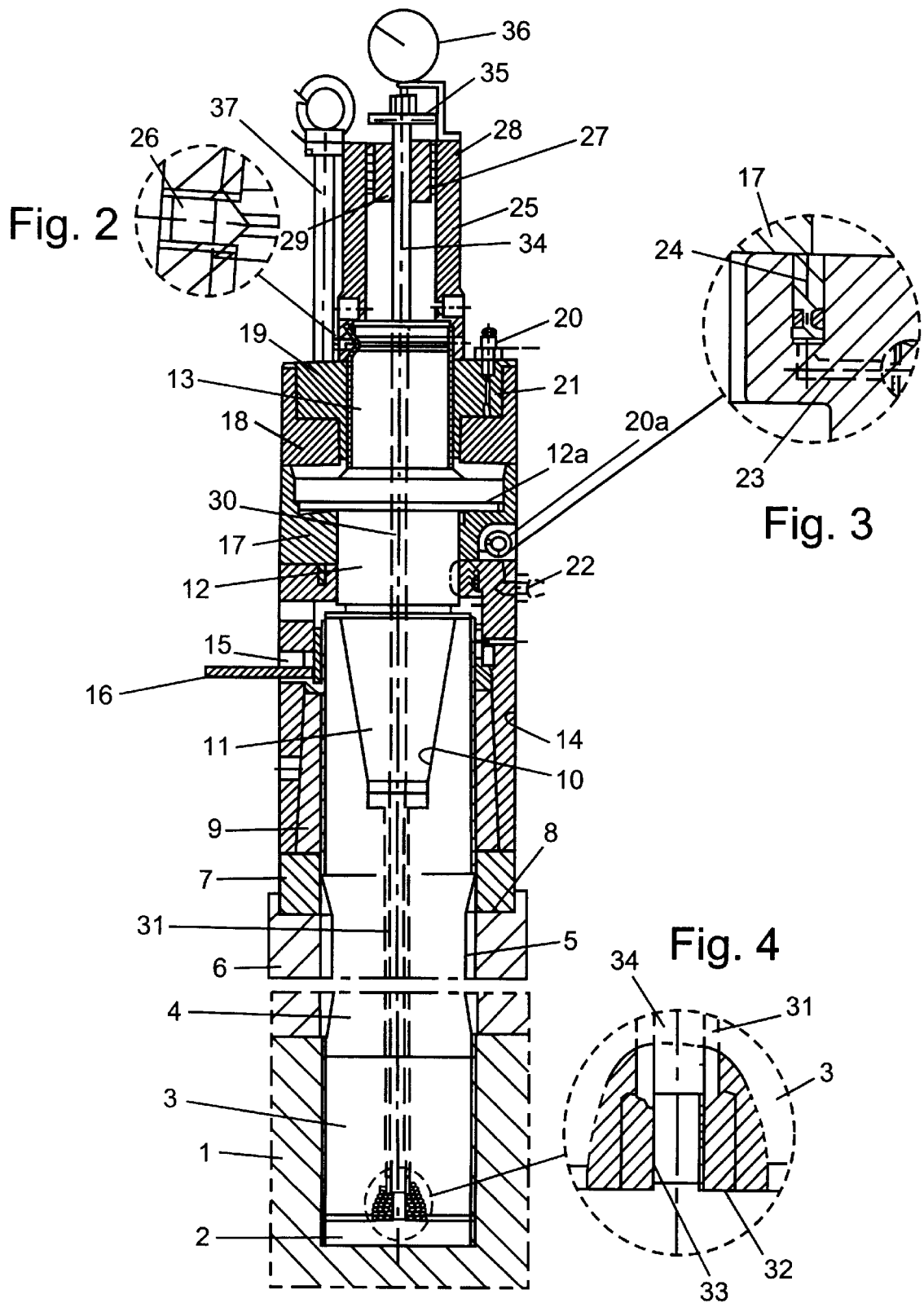

SAFETY DEVICE FOR PRELOADED BOLTS

The present invention relates to preloaded bolts and more particularly to hydraulically preloaded bolts subjected to high preloads, and more specifically it provides a safety device for such preloaded bolts.

For locking different elements to each other it is well known to use bolt and nut joints. It furthermore is well known to stretch such bolts axially before the nuts are tightened, whereby the bolt joint will have internal stresses preventing the nut from being untightened during operation.

Bolt joints of this kind are used, for example, as casing bolts for securing the casing of steam and gas turbines to the pressure vessel. Such applications require large preloads and the bolt joints will be subjected to very high tensile stresses particularly during the mounting and preloading operations, and this means that there always is a risk that the bolts during mounting and preloading will develop crack formation, which in some cases also may result in bolt rupture.

Breaking tests may show that the heavy nut and bolt fractions, which part from the rest of the bolt, at such a breakage will be thrown several tens of meters up in the air for a vertically positioned bolt. This of course presents a large and serious risk for damages to material and injuries to personnel.

The purpose of the present invention is to provide a safety device for such preloaded bolt joints, by which the risk for such damages and injuries is substantially reduced, and for accomplishing this the safety device according to the invention has been given the features defined in the accompanying claim 1.

Hereinafter the invention will be further described with reference to a non-limiting embodiment illustrated in the accompanying drawing.

FIG. 1 shows in a longitudinal cross section a bolt joint provided with a safety device according to the invention.

FIGS. 2–4 are enlarged detail views from FIG. 1.

FIG. 1 shows in a longitudinal cross section a fraction of a first element 1, e.g. a pressure vessel wall, and in which is provided a threaded blind hole 2, wherein is screwed in the threaded free end of a bolt 3. The shank 4 of the bolt 3 extends with clearance through a through-bore 5 in a second element 6, e.g. a casing for the pressure vessel.

A thrust washer 7 is arranged in an annular recess 8 in the second element 6 encircling the through-bore 5 thereof. This thrust washer 7 serves as a support for a nut 9 which is tightened on the threaded end of the bolt 3 projecting from the second element 6 and the thrust washer 7. In the free end of the bolt 3 there is provided a threaded tapering centric recess 10, in which is screwed in a threaded tapering portion 11 of a connecting piece 12 having at its opposite end a cylindrical threaded portion 13 and forming part of a hydraulic device intended for stretching the bolt 3 for creating therein a desired preload. Between the unthreaded part 12 and the threaded part 13 of the connecting piece is provided an adaptor 12a. This device incorporates a distance collar 14 arranged to enclose the nut 9 while resting with its lower end surface against the thrust washer 7. This distance collar 14 has a slotted opening 15 for allowing a tool 16 to reach the nut 9 for tightening it during assembly. The hydraulic device further incorporates two substantially annular members 17, 18 forming a hydraulic cylinder in which is arranged a hydraulic piston 19, rigidly connected to the threaded end portion 13 of the connecting piece 12, and also the earlier mentioned adaptor 12a, rigidly connected to the end portion 13 and serving as a second hydraulic piston. A connector 20 is provided in the piston 19 and connected to a duct 21 for supply of hydraulic pressure fluid to the space between piston 19 and the hydraulic cylinder 18, whereas another connector 20a is provided in the wall of the annular member 17 for supply of hydraulic pressure fluid to the space between the adaptor 12a and the member 17. Both connectors are preferably fed with pressure fluid of the same pressure simultaneously. Another connector 22 is connected to a duct 23 communicating with the interior of the hydraulic cylinder via a retraction piston 24 (see FIG. 3).

So far the device for causing preloading of the bolt is substantially earlier known. When a hydraulic fluid under pressure is introduced between the hydraulic cylinder 17, 18 and the hydraulic piston 19, this will move axially in upwards direction as shown in the drawing, thereby subjecting the bolt 3 to a tensile force stretching the bolt 3, which can then be secured in this preloaded state by tightening the nut 9, via the tool 16. If however the bolt during such preloading should break, due to material failure or for other reasons, heavy parts of the equipment could come loose and be thrown upwards forcefully, if there were no safety device to prevent such incidents from happening.

For this reason there now is provided a safety device incorporating an outer sleeve 25 arranged coaxially with and rigidly attached via screws 26 (see FIG. 2) to the top end of the threaded end portion 13 of the connecting piece 12. In the interior of the outer sleeve 25 and at the end thereof turned away from the connecting piece 12 there is arranged an intermediate sleeve 27, wherein is provided an expanding plug 28, which has a central through-hole 29. This central through-hole 29 in the expanding plug 28 is aligned with corresponding through-holes 30, 31 in the connecting piece 12 and its tapering portion 11 and in the bolt 3. At the bottom of the bolt 3 in said through-hole 31 there is provided an insert 32 with an internally threaded bore 33 (see FIG. 4). A tensile bar 34 is provided to extend through this series of aligned bores 29, 30, 31, having its lower end firmly but detachably screwed into the threads 33 of the insert 32, and being received in the expanding plug 28 and being secured to the expanding plug 28 via a nut 35 provided above it.

If a bolt rupture should happen when this type of safety device is used, the centrally positioned tensile bar 34 in combination with the friction between the expanding plug 28, the sleeve 27 and the cylinder 35, will ascertain that the released energy will be absorbed without risking that the elements that may part from the bottom piece of the bolt during a break will be thrown away.

By combining the arrangement described with a dial indicator 36 contacting the top part of the tensile bar 34 it is furthermore possible to measure the instant elongation and preloading of the bolt 3.

After stretching and tightening each bolt of a bolt connection in the manner described, the hydraulic device and the safety device shall preferably be dismounted and this can easily be done by unscrewing the tensile bar 34 from its connection to the insert 32 at the bottom of the bolt 3, and the tapering part 11 of the connecting piece 12 from the recess 10 in the upper end of the bolt 3, whereupon the entire unit can be lifted with use of a lifting bar 37 fitted to the hydraulic device.

The invention is not limited to the embodiment shown in the drawings and described in connection thereto but modifications and variations are possible within the scope of the attached claims.

What is claimed is:

1. A safety device for use when hydraulically subjecting a bolt to a high preload in order to provide said bolt with an internal stress in a mounted condition, wherein a first end of said bolt is secured to a first element and extends through a second element which is clamped to said first element, and where a hydraulic preloading device is temporarily applied to a second end of said bolt for axially stretching the bolt to create said internal stress, the safety device comprises:

a safety tensile bar detachably connected at one end thereof to said first end of the bolt and extending through a central bore in the bolt and further through said hydraulic preloading device, an expanding plug; and a sleeve, wherein said safety tensile bar being held adjacent its opposite end in the expanding plug and the expanding plug is in frictional contact with the sleeve for guiding said plug and provided to create a counterhold absorbing relieved energy in case of the breaking of the bolt during the preloading operation.

2. A device as claimed in claim 1, wherein the expanding plug and its guiding sleeve are detachably fitted to and resting upon the part of the pre-loading device facing away from said bolt.

3. A device as claimed in claim 1, wherein said top end portion of the tensile bar is arranged to engage the measuring tip of a dial indicator for indicating the instant axial stretching of said bolt.

* * * * *